United States Patent
Gupta et al.

(10) Patent No.: US 10,929,034 B2
(45) Date of Patent: Feb. 23, 2021

(54) ALLOCATION OF TASK CONTROL BLOCKS IN A STORAGE CONTROLLER FOR STAGING AND DESTAGING BASED ON STORAGE RANK RESPONSE TIME

(71) Applicant: International Business Machines Corporation, Armonk, NY (US)

(72) Inventors: Lokesh M. Gupta, Tucson, AZ (US); Kyler A. Anderson, Sahuarita, AZ (US); Kevin J. Ash, Tucson, AZ (US); Matthew G. Borlick, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/974,602

(22) Filed: May 8, 2018

(65) Prior Publication Data

US 2019/0347021 A1 Nov. 14, 2019

(51) Int. Cl.
*G06F 3/00* (2006.01)
*G06F 3/06* (2006.01)
*G06F 9/48* (2006.01)

(52) U.S. Cl.
CPC ............ *G06F 3/0631* (2013.01); *G06F 3/064* (2013.01); *G06F 3/0679* (2013.01); *G06F 9/4806* (2013.01)

(58) Field of Classification Search
None
See application file for complete search history.

(56) References Cited

U.S. PATENT DOCUMENTS

| | | | |
|---|---|---|---|
| 7,191,207 B2 | 3/2007 | Blount et al. | |
| 8,478,945 B2 | 7/2013 | Ash et al. | |
| 8,924,637 B2 | 12/2014 | Iwamura et al. | |
| 9,870,323 B2 | 1/2018 | Benhase et al. | |
| 2009/0222621 A1* | 9/2009 | Ash | G06F 3/0613 711/112 |
| 2013/0132667 A1* | 5/2013 | Benhase | G06F 12/0802 711/113 |
| 2015/0277789 A1* | 10/2015 | White | G06F 3/0619 711/114 |
| 2017/0010944 A1 | 1/2017 | Saito et al. | |

* cited by examiner

*Primary Examiner* — David Yi
*Assistant Examiner* — Craig S Goldschmidt
(74) *Attorney, Agent, or Firm* — Rabindranath Dutta; Konrad, Raynes, Davda and Victor LLP

(57) ABSTRACT

Stage task control blocks (TCB) are allocated for performing staging operations in a storage controller controlling one or more storage ranks. Destage TCBs are allocated for performing destaging operations in the storage controller. The storage controller adjusts how many stage TCBs and destage TCBs are to be allocated based on response times of the one or more storage ranks.

15 Claims, 12 Drawing Sheets

ALLOCATION OF TASK CONTROL BLOCKS IN A STORAGE CONTROLLER FOR STAGING AND DESTAGING BASED ON STORAGE RANK RESPONSE TIME

BACKGROUND

1. Field

Embodiments relate to the allocation of task control blocks in a storage controller for staging and destaging based on storage rank response time.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual-server based storage controller, in the event of a failure of one or the two servers, the other server that has not failed may take over the operations performed by the failed server.

Data written from a host may be stored in the cache and non-volatile storage (NVS) of the storage controller and at an opportune time the data may be destaged (i.e., moved or copied) to a storage device, such as, a hard disk drive (HDD) or a solid state drive (SSD). Write data is stored in the NVS in addition to the cache to avoid loss of data in case of a loss of power to the cache. Data may also be staged (i.e., moved or copied) from a storage device to the cache of the storage controller. The storage controller may respond to a read I/O request from the host from the cache, if the data for the read I/O request is available in the cache, otherwise (i.e., in the event of a read miss from the cache) the data may be staged from a storage device to the cache for responding to the read I/O request. Since the storage capacity of the cache and NVS is relatively small in comparison to the storage capacity of the storage devices, data may be periodically destaged to a storage device to create empty storage space in the cache and NVS. I/O is much faster with respect to the cache and NVS than with respect to storage devices, such as, HDDs or SSDs.

As computer programs execute in a storage controller, the storage controller may keep track of the operations executed by the computer programs and certain associated data, in storage areas referred to as control blocks. A task control block (TCB) is a control block that represents a task that executes in the storage controller, where a task may comprise a set of program instructions that are loaded in memory. Stage TCBs may keep track of staging operations in a storage controller, whereas destage TCBs may keep track of destaging operations in a storage controller.

Redundant Array of Independent Disks (RAID) is a data storage virtualization technology that combines multiple physical disk drive components into one or more logical units for the purposes of data redundancy, performance improvement, or both. Data is distributed across the drives in one of several ways, referred to as RAID levels, depending on the required level of redundancy and performance. A RAID rank may comprise a set of storage volumes of one or more storage devices controlled by a storage controller. A plurality of logical volumes may be associated with a single RAID rank.

SUMMARY OF THE PREFERRED EMBODIMENTS

Provided are a method, system, and computer program product in which stage task control blocks (TCB) are allocated for performing staging operations in a storage controller controlling one or more storage ranks. Destage TCBs are allocated for performing destaging operations in the storage controller. The storage controller adjusts how many stage TCBs and destage TCBs are to be allocated based on response times of the one or more storage ranks.

In additional embodiments, more stage TCBs or destage TCBs are allocated, in response to determining that a storage rank has a response time that is lower than a first threshold.

In yet additional embodiments, the allocation of both stage TCBs and destage TCBs are stopped, in response to determining that the response time of the storage rank exceeds a second threshold that is greater than the first threshold.

In certain embodiments, the adjusting of how many stage TCBs and destage TCBs are to be allocated is also based on an amount of usage of a non-volatile storage (NVS) of the storage controller.

In further embodiments, the adjusting of how many stage TCBs and destage TCBs are to be allocated is also based on how many stage TCBs are needed and how many destage TCBs are needed.

In yet further embodiments, the computing of how many stage TCBs are needed is based on how many read misses are waiting for a stage TCB.

In further embodiments, the computing of how many destage TCBs are needed is based on at least NVS usage for a storage rank, a maximum NVS space allowed for the storage rank, and a low threshold of NVS usage for the storage rank below which there is no need to allocate destage TCBs.

BRIEF DESCRIPTION OF THE DRAWINGS

Referring now to the drawings in which like reference numbers represent corresponding parts throughout.

DETAILED DESCRIPTION

Figure 1:
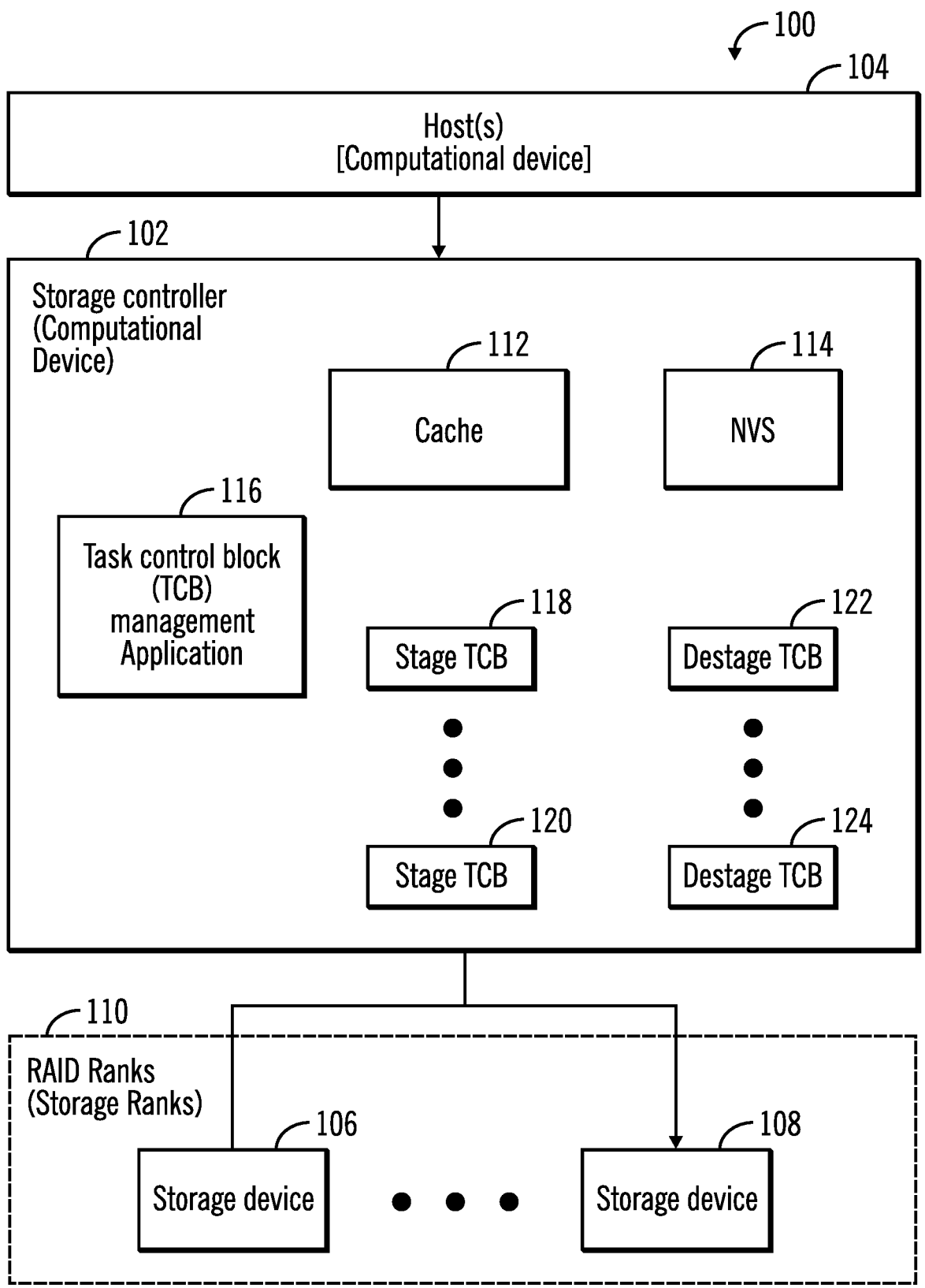
FIG. 1 illustrates a block diagram of a computing environment comprising a storage controller coupled to one or more hosts and one or more storage devices that are configured into a plurality of storage ranks, in accordance with certain embodiments.

In the following description, reference is made to the accompanying drawings which form a part hereof and which illustrate several embodiments. It is understood that other embodiments may be utilized and structural and operational changes may be made.

Limitation on Maximum Number of Stage TCBs and Destage TCBs

Write data from a host is written to both the cache and the NVS of a storage controller, where the storage capacity of the NVS is usually much smaller than the cache. At an opportune time, a background process may use destage TCBs to destage data from the NVS to a storage rank. The number of destage TCBs allocated for performing the destages may be based on NVS usage, where NVS usage refers to the fraction of NVS being used for storing write data which has yet to be destaged. If a high amount (e.g., over 70% of the NVS) of NVS is in use for storing write data, then the number of destage TCBs may be increased to destage the write data so that the NVS does not get full. In certain mechanisms, there is a "maximum number of destage TCBs" based on RAID type. For example, spinning disk ranks may be provided with a maximum number of 60 destage TCBs. Destage TCBs are allocated between 0 to the "maximum number of destage TCBs" based on overall NVS usage and NVS usage by a rank.

For stage TCBs, there may be a "maximum number for stage TCBs" for a RAID type. For example, spinning disk ranks may have a maximum of 70 stage TCBs. As cache misses occur, stage requests are generated for the rank. The number of stage TCBs may increase up to the "maximum number of stage TCBs" for that rank. Once the "maximum number of stage TCBs" are allocated then any new stage requests necessitated by read operations are queued as the host is waiting for the read operations to complete. When a stage TCB completes the stage operations, the stage TCB may process any queued up stage requests.

Exemplary Embodiments

High capacity drives may provide good read performance but write performance may depend on whether the writes to the high capacity drive are sequential or random. Providing a static maximum for stage or destage TCBs may not optimize performance for all workloads. For example, if the number of stage TCBs are restricted to a maximum of 60, then even if no destage TCBs are needed for destage, more stage TCBs cannot be allocated even if storage ranks are able to provide good response time for accommodating more stages from the cache.

Certain embodiments provide improvements to operations of a storage controller, by provide mechanisms for improving allocation of TCBs by allocating stage TCBs based on a queue size of waiting stage requests, and destage TCBs based on NVS usage, where the number of stage and destage TCBs may be increased until response time for storage ranks exceeds a maximum acceptable threshold. Additionally, stage and destage TCBs are allocated until the response time for storage ranks falls below a minimum threshold. Decisions are made on the type of TCB (stage or destage) that are to be allocated at a given instant of time.

FIG. 1 illustrates a block diagram of a computing environment 100 comprising a storage controller 102 coupled to one or more hosts 104 and one or more storage devices 106, 108 that are configured as RAID ranks 110, in accordance with certain embodiments. The RAID ranks 110 may be referred to as storage ranks, and configurations other than RAID may be used for the storage ranks.

The storage controller 102 allows the one or more hosts 104 to perform input/output (I/O) operations with logical storage maintained by the storage controller 102 in the storage ranks 110. The physical storage corresponding to the logical storage may be found in one or more of the storage devices 106, 108 and/or a cache 112 and NVS 114 of the storage controller 102.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the storage controller 102 may be comprised of a plurality of servers. The plurality of servers may provide redundancy because if one server undergoes a failure from which recovery is not possible, an alternate server may perform the functions of the server that failed. Each of the plurality of servers may be referred to as a processing complex and may include one or more processors and/or processor cores.

The storage controller 102 and the one or more hosts 104 may be elements in any suitable network, such as, a storage area network, a wide area network, the Internet, an intranet. In certain embodiments, storage controller 102 and the one or more hosts 104 may be elements in a cloud computing environment.

The cache 112 may be any suitable cache known in the art or developed in the future. In some embodiments, the cache 112 may be implemented with a volatile memory (and optionally non-volatile memory), and the NVS 114 with non-volatile memory. Write requests from the host 104, trigger write operations on both the cache 112 and the NVS 114, whereas reads requests from the host 104 trigger read operations from the cache 112.

A TCB management application 116 may generate one or more stage TCBs 118, 120 to stage data from the storage ranks 110 to the cache 112. The TCB management application 116 may generate one or more destage TCBs 122, 124 to destage data from the NVS 114 to the storage ranks 110. In certain embodiments, TCB management application 116 may be implemented in software, firmware, hardware or any combination thereof. The generation of stage TCBs 118, 120 and destage TCBs 122, 124 may also be referred to as allocation of TCBs.

Figure 2:
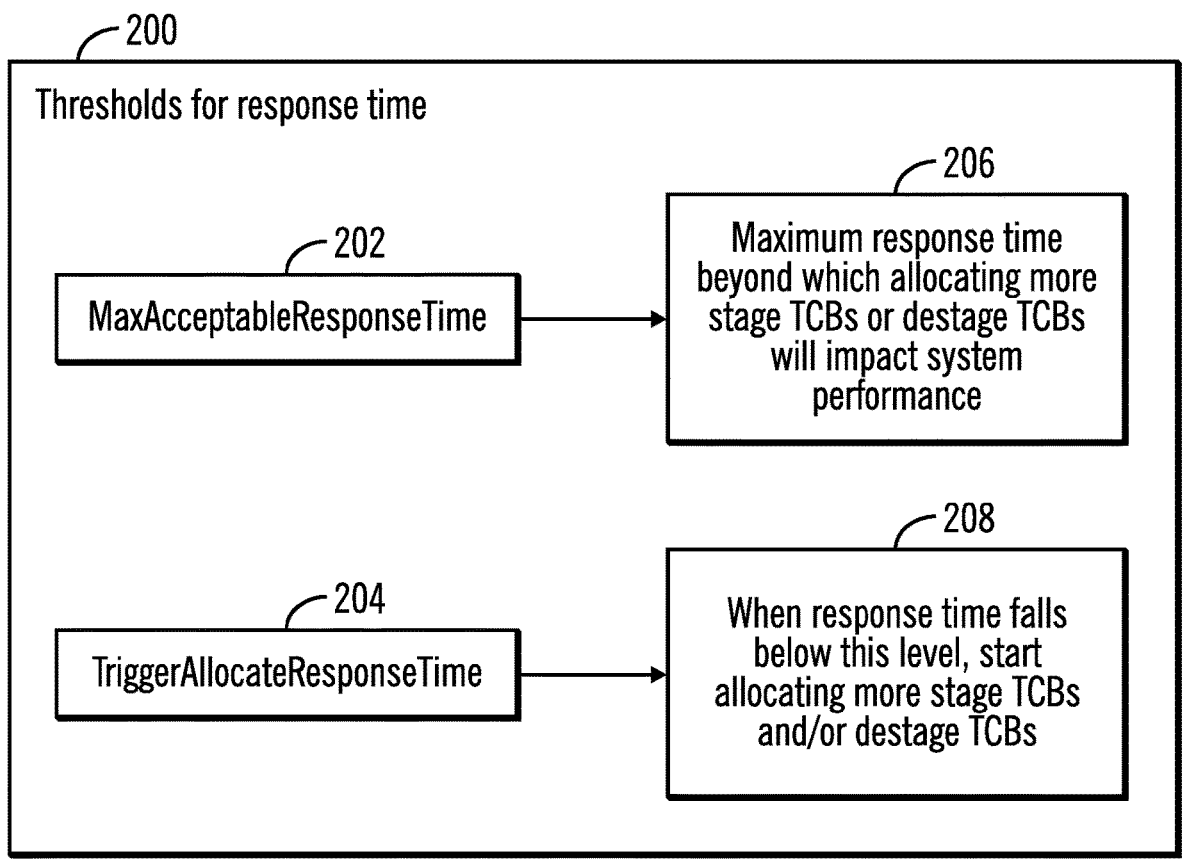
FIG. 2 illustrates a block diagram that shows thresholds for response time of a storage rank, in accordance with certain embodiments.

FIG. 2 illustrates a block diagram 200 that shows thresholds for response time of a storage rank, in accordance with certain embodiments. The response time of a storage rank may comprise the average response time to respond to an I/O operation. In alternative embodiments, the response time of a storage rank may comprise the median response time to respond to an I/O operations. For example, if the average response time is 2 microsecond for a storage rank, then on an average the storage rank responds to provide data for an I/O in 2 microseconds.

The TCB management application 116 stores two variables referred to as MaxAcceptableResponseTime 202 and TriggerAllocateResponseTime 204. The MaxAcceptableResponseTime 202 is the maximum response time of a storage rank beyond which allocating more stage TCBs or destage TCBs may impact system performance (as shown via reference numeral 206). The TriggerAllocateResponseTime 204 is a level of response time of a storage rank such that when the response time falls below this level, the TCB management application 116 starts allocating more stage TCBs and/or destage TCBs. Thus, the TCB management application 116 controls the number of TCBs being created based on the response time of the storage ranks 110.

Figure 3:
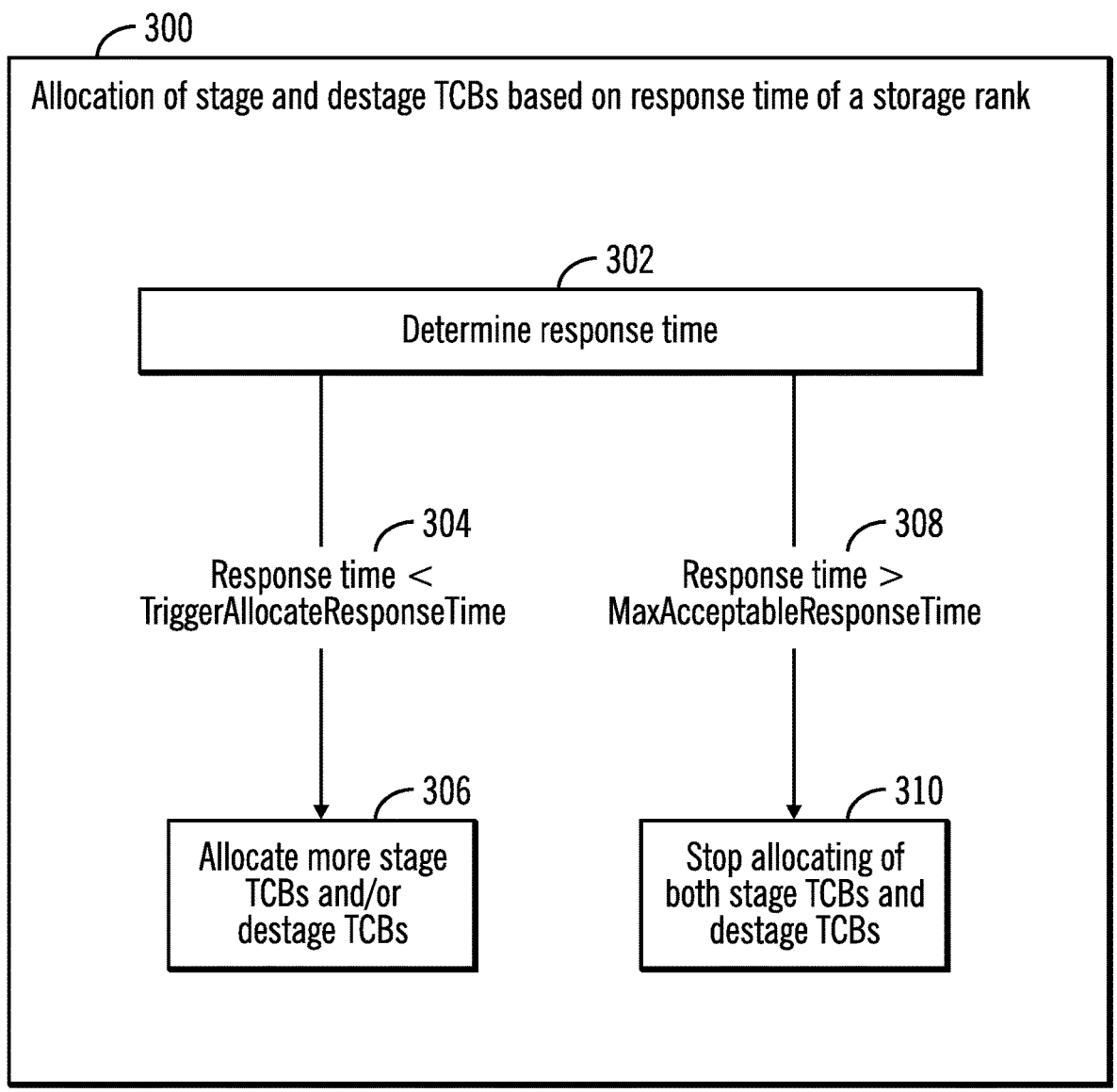
FIG. 3 illustrates a block diagram that shows allocation of stage TCBs and destage TCBs based on response time of a storage rank, in accordance with certain embodiments.

FIG. 3 illustrates a block diagram 300 that shows allocation of stage TCBs and destage TCBs based on response time of a storage rank, in accordance with certain embodiments.

Control starts at block 302 in which the TCB management application 116 determines the response time of a storage rank 110. The response time may be determined by computing an average of the response time for the storage rank 110 to I/O operations in a predetermined amount of time (e.g., in the last 10 minutes).

If at block 302, the TCB management application 116 determines that the response time is less than the TriggerAllocateResponseTime 204 (branch 304), then control proceeds to block 306 in which the TCB management application 116 allocates more stage and/or destage TCBs as needed.

If at block 302, the TCB management application 116 determines that the response time is greater than the MaxAcceptableResponseTime 202 (branch 308), then control proceeds to block 310 in which the TCB management application 116 stops allocating both stage TCBs and destage TCBs.

Therefore, FIG. 3 illustrates certain embodiments, in which stage and destage TCBs are allocated based on response times of storage ranks 110. Certain embodiments increase stage or destage TCBs until response time reaches MaxAcceptableResponseTime, and then waits for response time to fall below TriggerAllocateResponseTime before allocating more stage or destage TCBs.

Additionally, certain embodiments attempt to determine whether to allocate stage or destage TCBs at any given time. In order to perform this determination, the TCB management applications may need to calculate how many stage TCBs and how many destage TCBs are needed at the given time.

Figure 4:
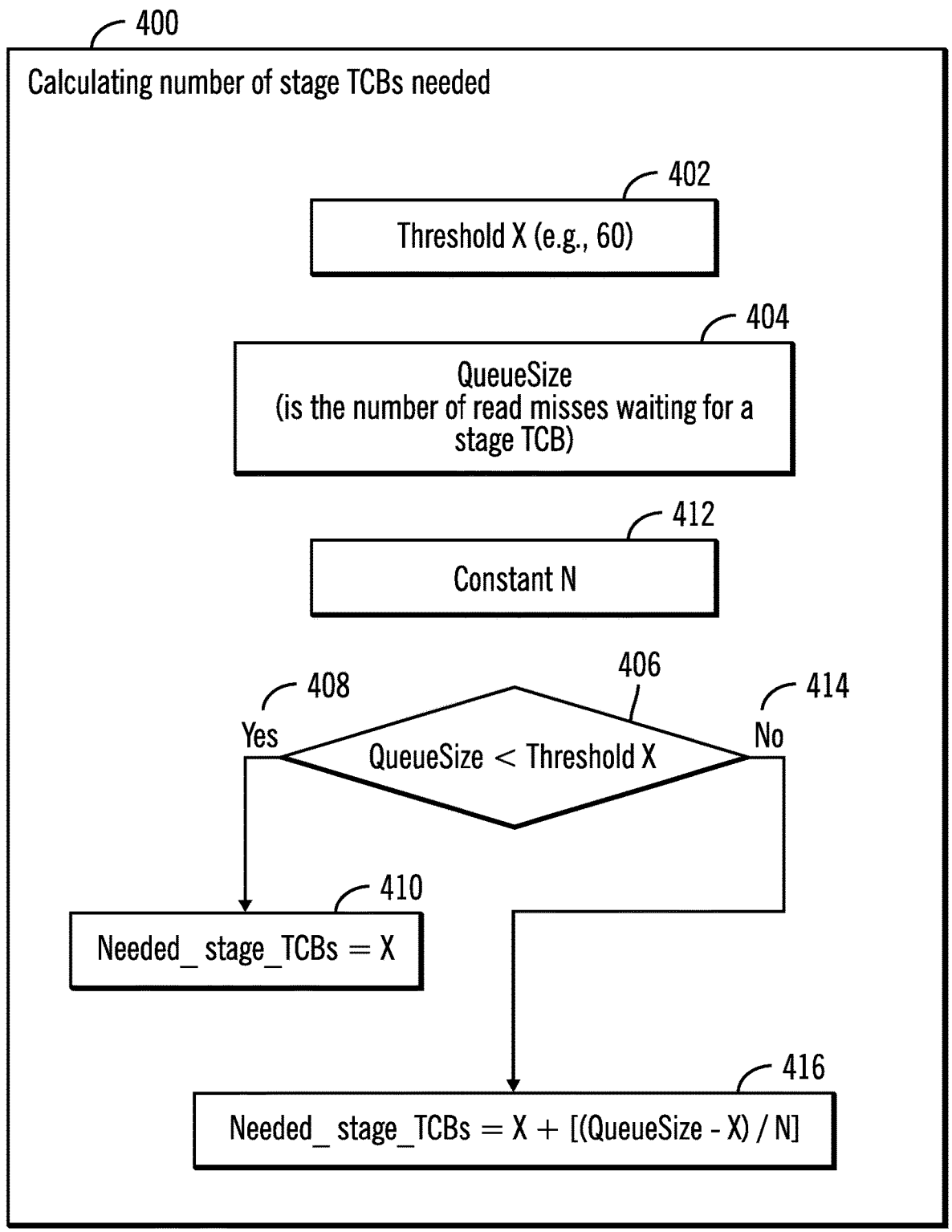
FIG. 4 illustrates a diagram that shows the calculation of the number of stage TCBs that are needed, in accordance with certain embodiments.

FIG. 4 illustrates a diagram 400 that shows the calculation of the number of stage TCBs that are needed by a storage rank, in accordance with certain embodiments. The calculation may be performed periodically (e.g., every 20 ms.) by the TCB management application 116.

The TCB management application 116 maintains a threshold X (e.g., X may be 60) 402, such that if the QueueSize 404 (i.e., the number of read misses from cache 112 waiting for a stage TCB) is less than X, then the number of stage TCBs needed at a given time (Needed stage TCBs) is X [as shown via the flow in blocks 406, 408, 410].

The TCB management application 116 maintains a constant N 412, such that if the QueueSize 404 (i.e., the number of read misses from cache 112 waiting for a stage TCB) is not less than X, then the number of stage TCBs needed (Needed stage TCBs) is X+[(QueueSize−X)/N] (as shown via the flow in blocks 406, 414, 416).

Therefore, FIG. 4 illustrates certain embodiments in which the number of stage TCBs needed is at least X, and increases progressively over X as the number of read misses waiting for a stage TCBs increases. The calculations shown in block 416 is illustrative, and other calculations may be performed in alternative embodiments to determine the number of needed stage TCBs based on the number of read misses waiting for stage TCBs.

Figure 5:
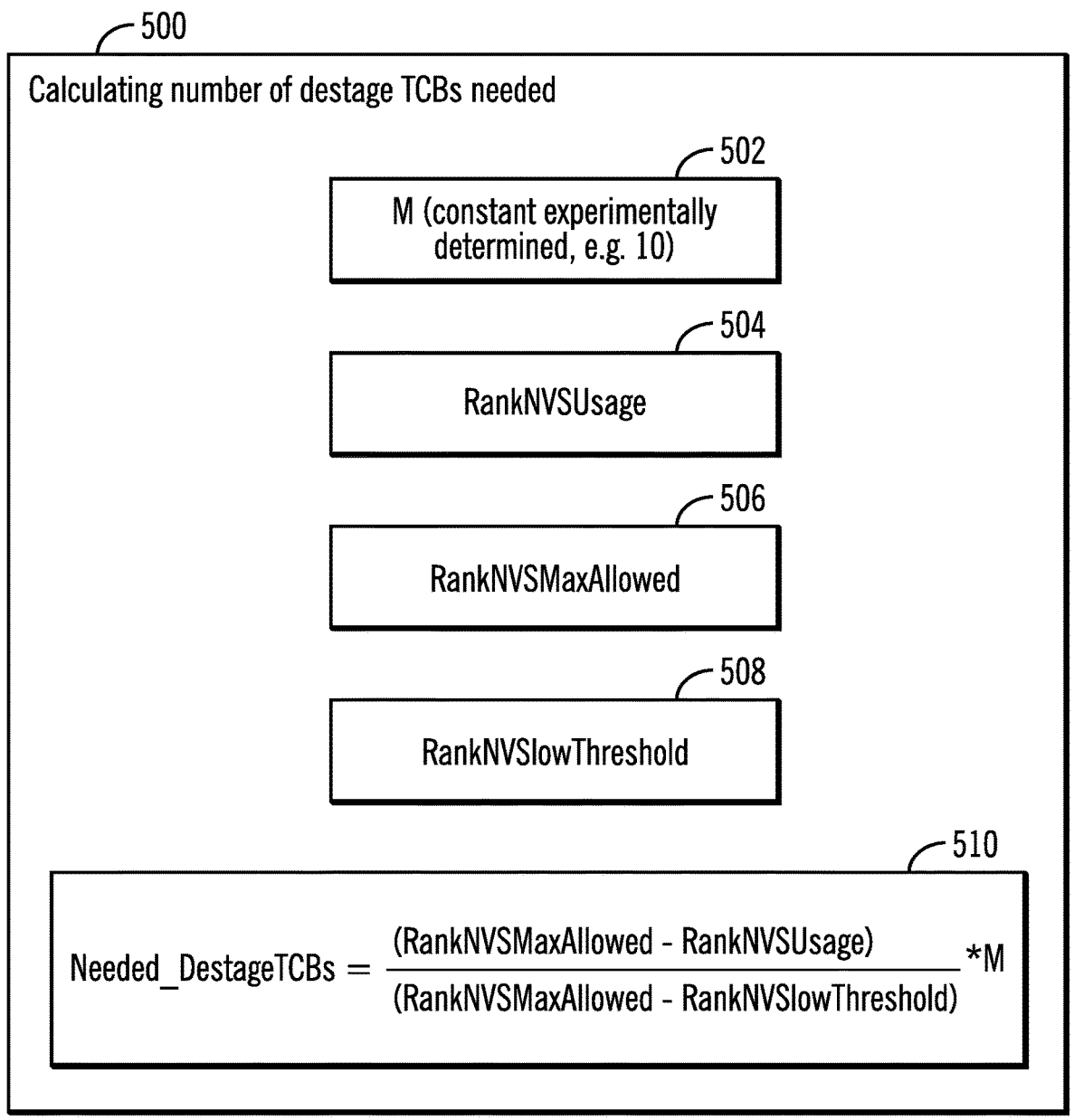
FIG. 5 illustrates a block diagram that shows the calculation of the number of destage TCBs that are needed, in accordance with certain embodiments.

FIG. 5 illustrates a block diagram 500 that shows the calculation of the number of destage TCBs that are needed by a storage rank, in accordance with certain embodiments. The calculation may be performed periodically (e.g., every 20 ms.) by the TCB management application 116.

The TCB management application 116 maintains the following variables and constants in the storage controller 102:
1) M: a constant (for example 10) determined by experimentation [shown via reference numeral 502];
2) RankNVSUsage 504 that indicates NVS usage of the storage rank (i.e., the amount of space of NVS 114 that stores write data to be destaged to the storage rank);
3) RankNVSMaxAllowed 506 that indicates the maximum amount of NVS space allowed for the storage rank; and
4) RankNVSlowThreshold 508 that indicates a low threshold of NVS usage below which there is no need to allocate destage TCB (For example, low threshold of NVS usage may be 30%).

In certain embodiments the needed number of destage TCBs (Needed DestageTCBs) may be calculated by computing the following (as shown via reference numeral 510):

$$[(RankNVSMaxAllowed-RankNVSUsage)/(RankNVSMaxAllowed-RankNVSlowThreshold)] \times M.$$

Therefore, FIG. 5 illustrates certain embodiments in which the number of destage TCBs needed is a function of NVS usage. Alternative embodiments may use other mechanisms to calculate the number of needed destage TCBs than those determined in block 510.

Figure 6:
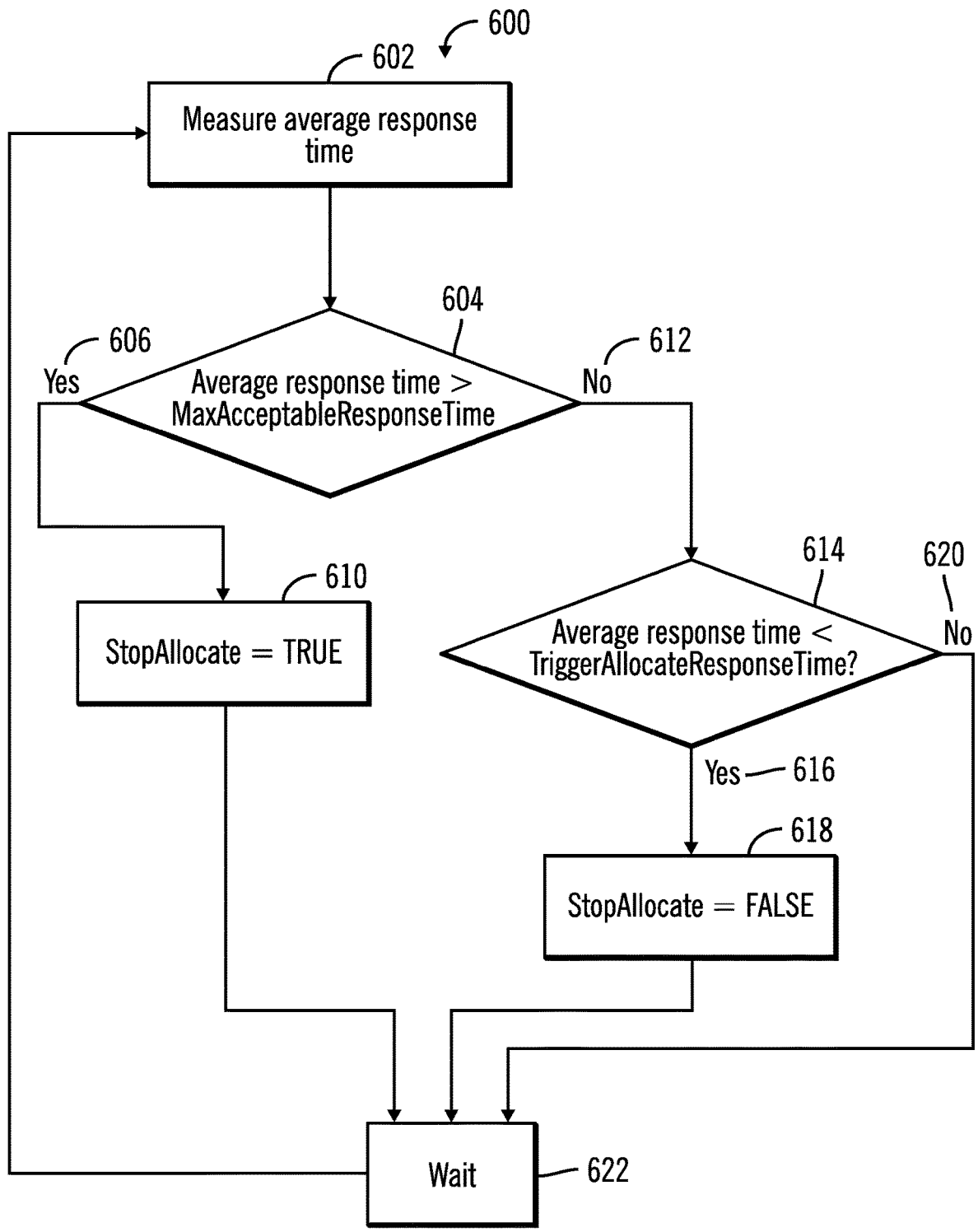
FIG. 6 illustrates a first flowchart that shows operations performed for adjusting the number of stage TCBs and destage TCBs, in accordance with certain embodiments.

FIG. 6 illustrates a first flowchart 600 that shows operations performed for adjusting the number of stage TCBs and destage TCBs, in accordance with certain embodiments. The operations shown in FIG. 6 may be performed by the TCB management application 116 that executes in the storage controller 102.

Control starts at block 602 in which the TCB management application 116 measures the average response time for a storage rank. Then control proceeds to block 604 in which the TCB management application 116 determines whether the average response time is greater than the MaxAcceptableResponseTime 202. If so ("Yes" branch 606) control proceeds to block 610 where the variable StopAllocate is set to TRUE. If not ("No" branch 612) control proceeds to block 614 in which the TCB management application 116 determines whether the average response time is less than the TriggerAllocateResponseTime 204.

If at block 614 it is determined that the average response time is less than the TriggerAllocateResponseTime 204 ("Yes" branch 616), then the variable StopAllocate is set to FALSE (at block 618), otherwise ("No" branch 620) control proceeds to block 622 where the process waits before returning to block 602. On conclusion of blocks 610, 618 the process waits before returning to block 602.

Therefore FIG. 6 illustrates certain embodiments in which the variable StopAllocate is set to TRUE or FALSE to provide an indication on whether or not to start or stop allocating destage TCBs.

Figure 7:
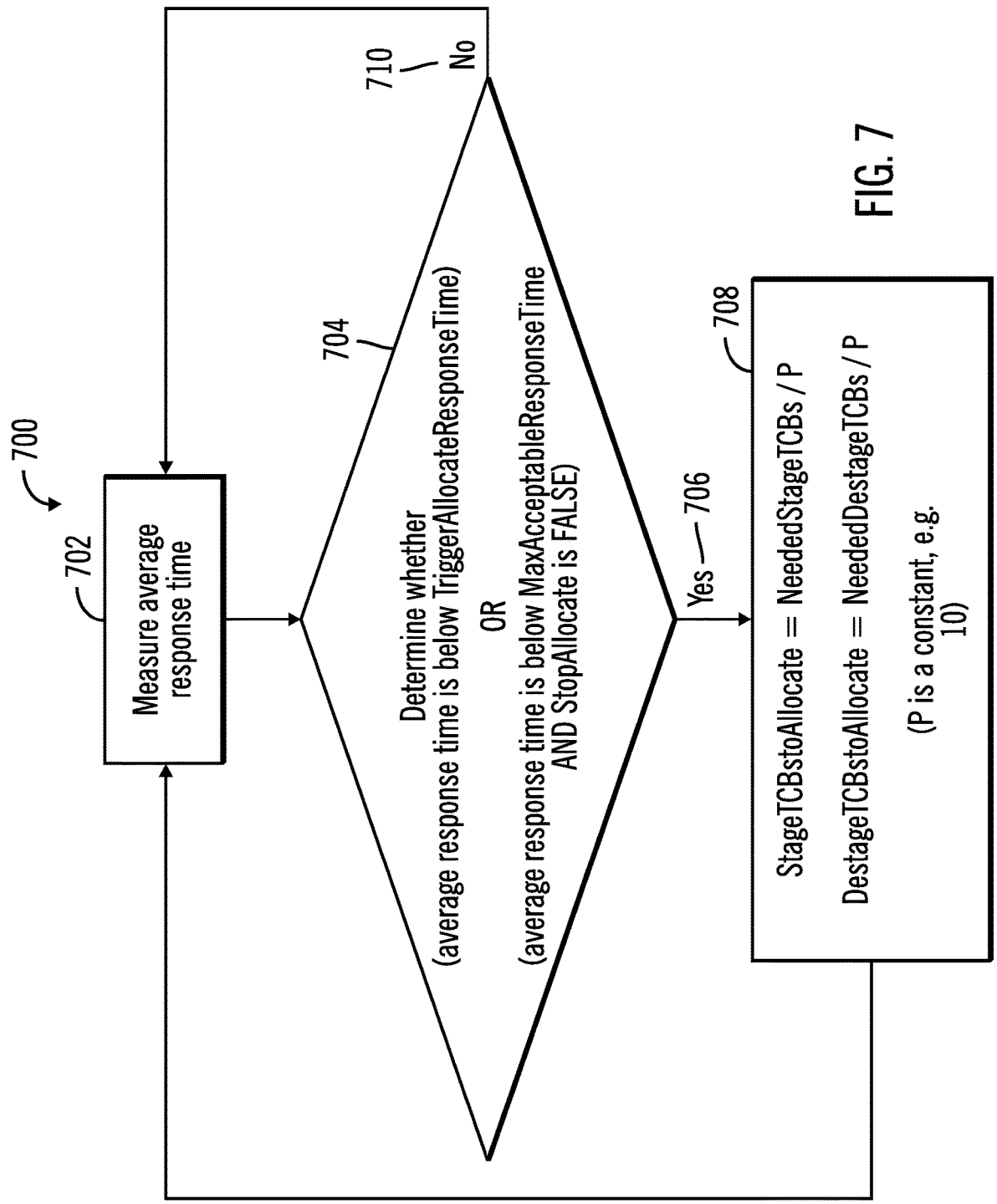
FIG. 7 illustrates a second flowchart that shows operations performed for adjusting the number of stage TCBs and destage TCBs, in accordance with certain embodiments.

FIG. 7 illustrates a second flowchart 700 that shows operations performed for adjusting the number of stage TCBs and destage TCBs, in accordance with certain embodiments. The operations shown in FIG. 7 may be performed by the TCB management application 116 that executes in the storage controller 102.

Control starts at block 702 in which the TCB management application 116 measures the average response time for a storage rank in a last interval (e.g., 1 sec.). Control proceeds to block 704 to determine whether the average response time is below the TriggerAllocateResponseTime 204, or if the average response time is below MaxAcceptableResponseTime 202 and StopAllocate is FALSE. If so ("Yes" branch 706), then the TCB management application 116 allocates the number of stage TCBs and destage TCBs as follows (as shown via block 708):

StageTCBsToAllocate=NeededStageTCBs/$P$, where $P$ is a constant; and

DestageTCBsToAllocate=NeededDestageTCBs/$P$.

If the "No" branch 710 is taken from the decision in block 704 then control returns to block 702. Also, control returns to block 702 from block 708.

Therefore, FIG. 7 illustrates certain embodiments that calculates the number of stage and destage TCBs to allocate at a given point in time based on the number of needed stage TCBs, the number of needed destage TCBs, and the response time of a storage rank.

Figure 8:
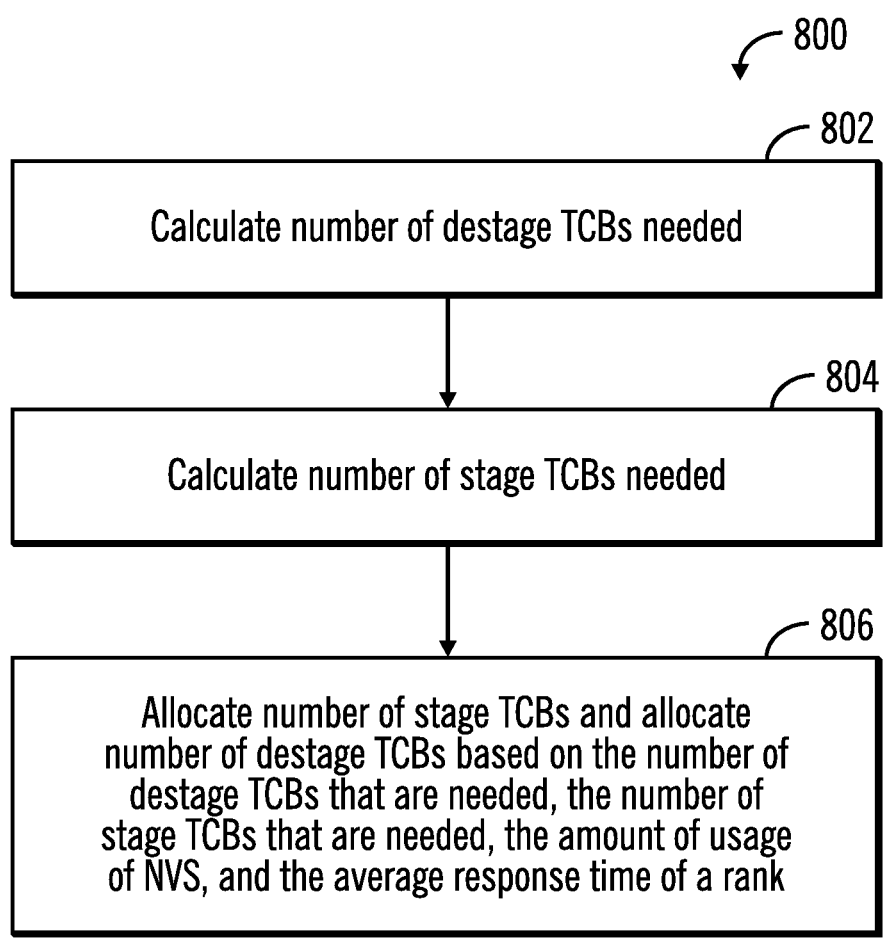
FIG. 8 illustrates a third flowchart that shows operations performed for adjusting the number of stage TCBs and destage TCBs, in accordance with certain embodiments.

FIG. 8 illustrates a third flowchart 800 that shows operations performed for adjusting the number of stage TCBs and destage TCBs, in accordance with certain embodiments. The operations shown in FIG. 8 may be performed by the TCB management application 116 that executes in the storage controller 102.

Control starts at block 802 in which the TCB management application 116 calculates the number of destage TCBs that are needed (e.g., via performing the operations shown at least in FIG. 5). Control proceeds to block 804 in which the TCB management application 116 calculates the number of stage TCBs that are needed (e.g., via performing the operations shown at least in FIG. 4). The TCB management application 116 allocates (at block 806) the number of stage TCBs and allocates the number of destage TCBs based on the number of destage TCBs that are needed, the number of stage TCBs that are needed, the amount of usage of NVS, and the average response time of a rank.

Figure 9:
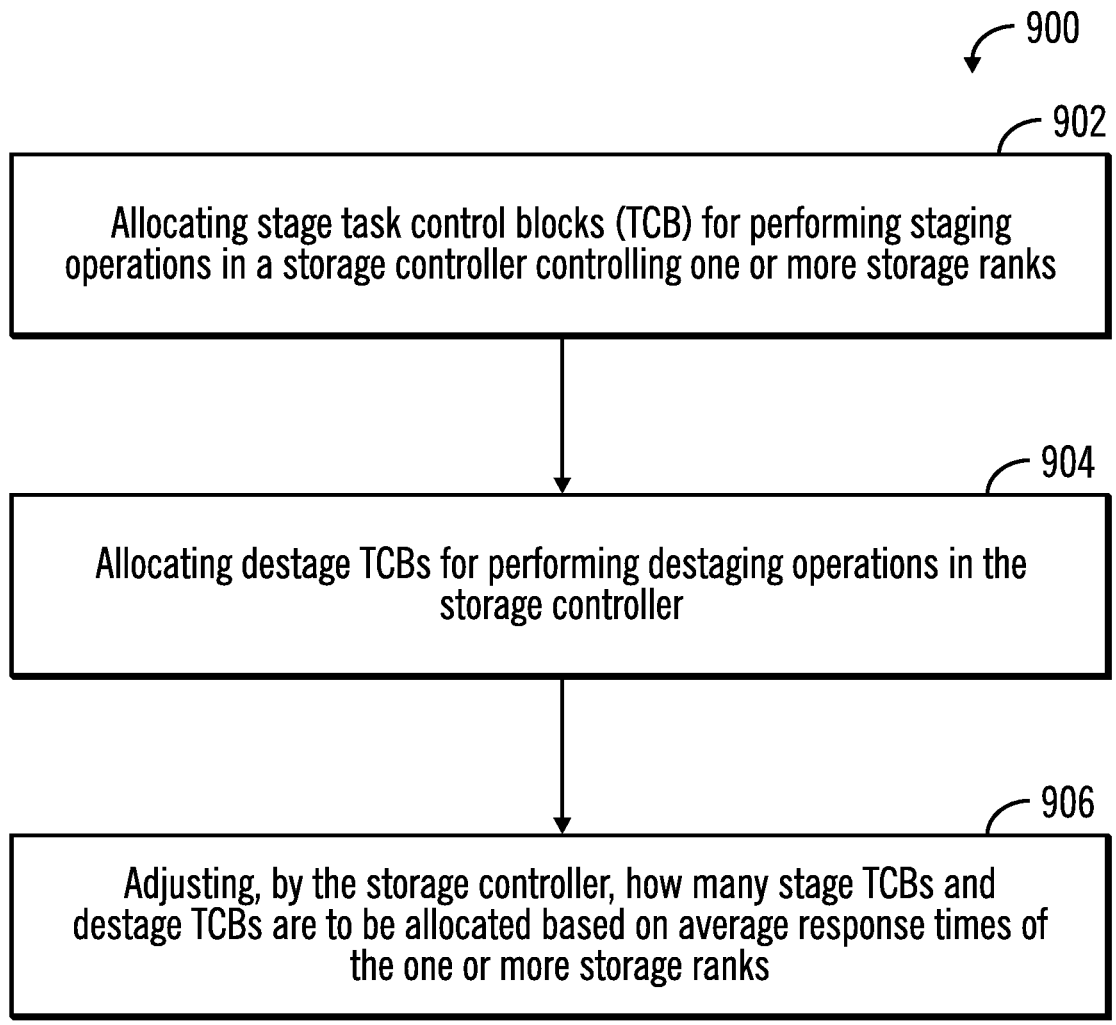
FIG. 9 illustrates a fourth flowchart that shows operations performed for adjusting the number of stage TCBs and destage TCBs, in accordance with certain embodiments.

FIG. 9 illustrates a fourth flowchart 900 that shows operations performed for adjusting the number of stage TCBs and destage TCBs, in accordance with certain embodiments. The operations shown in FIG. 9 may be performed by the TCB management application 116 that executes in the storage controller 102.

Control starts at block 902 which stage TCBs are allocated for performing staging operations in a storage controller 102 controlling one or more storage ranks 110. Destage TCBs are allocated (at block 904) for performing destaging operations in the storage controller 102. The storage controller 102 adjusts (at block 906) how many stage TCBs and destage TCBs are to be allocated based on response times of the one or more storage ranks 110.

Therefore, FIGS. 1-9 illustrate certain embodiments in which the number of stage TCBs and the number of destage TCBs are adjusted by taking into account the response times of storage ranks, the amount of usage of the NVS, and the number of read misses waiting for stage TCBs to improve the processing speed of a storage controller.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
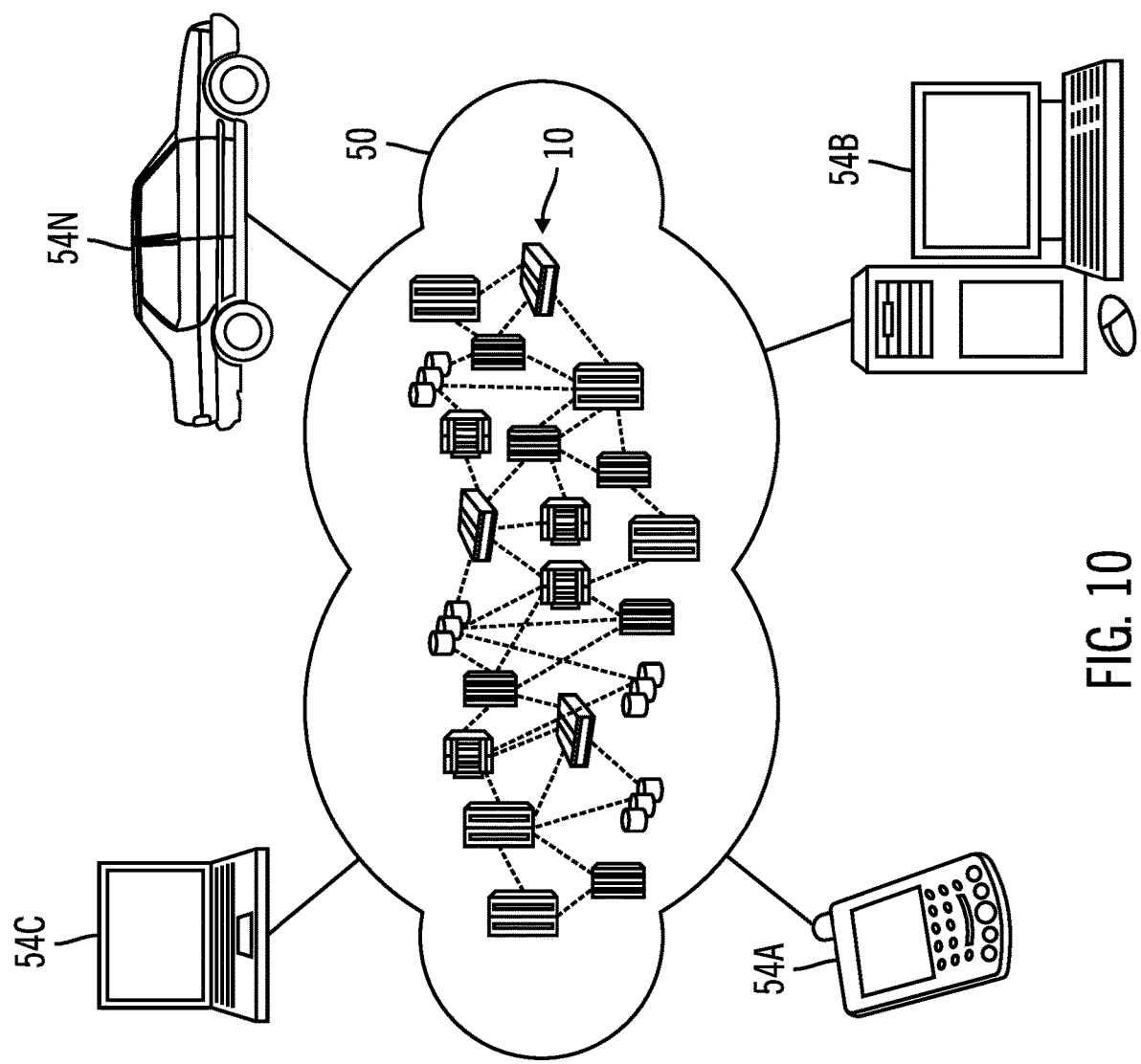
FIG. 10 illustrates a block diagram of a cloud computing environment, in accordance with certain embodiments.

Referring now to FIG. 10 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
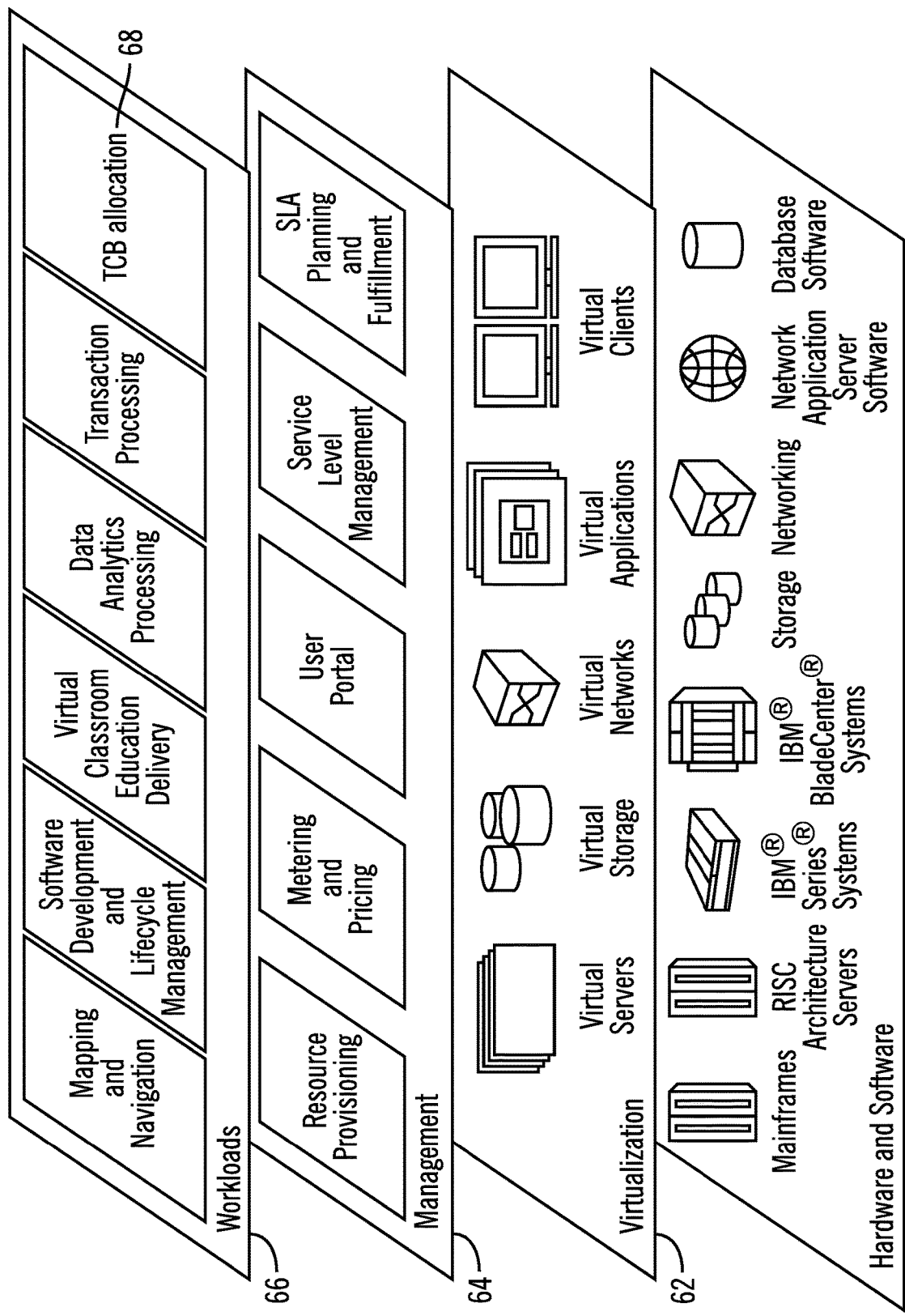
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and TCB allocation 68 as shown in FIGS. 1-10.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 12:
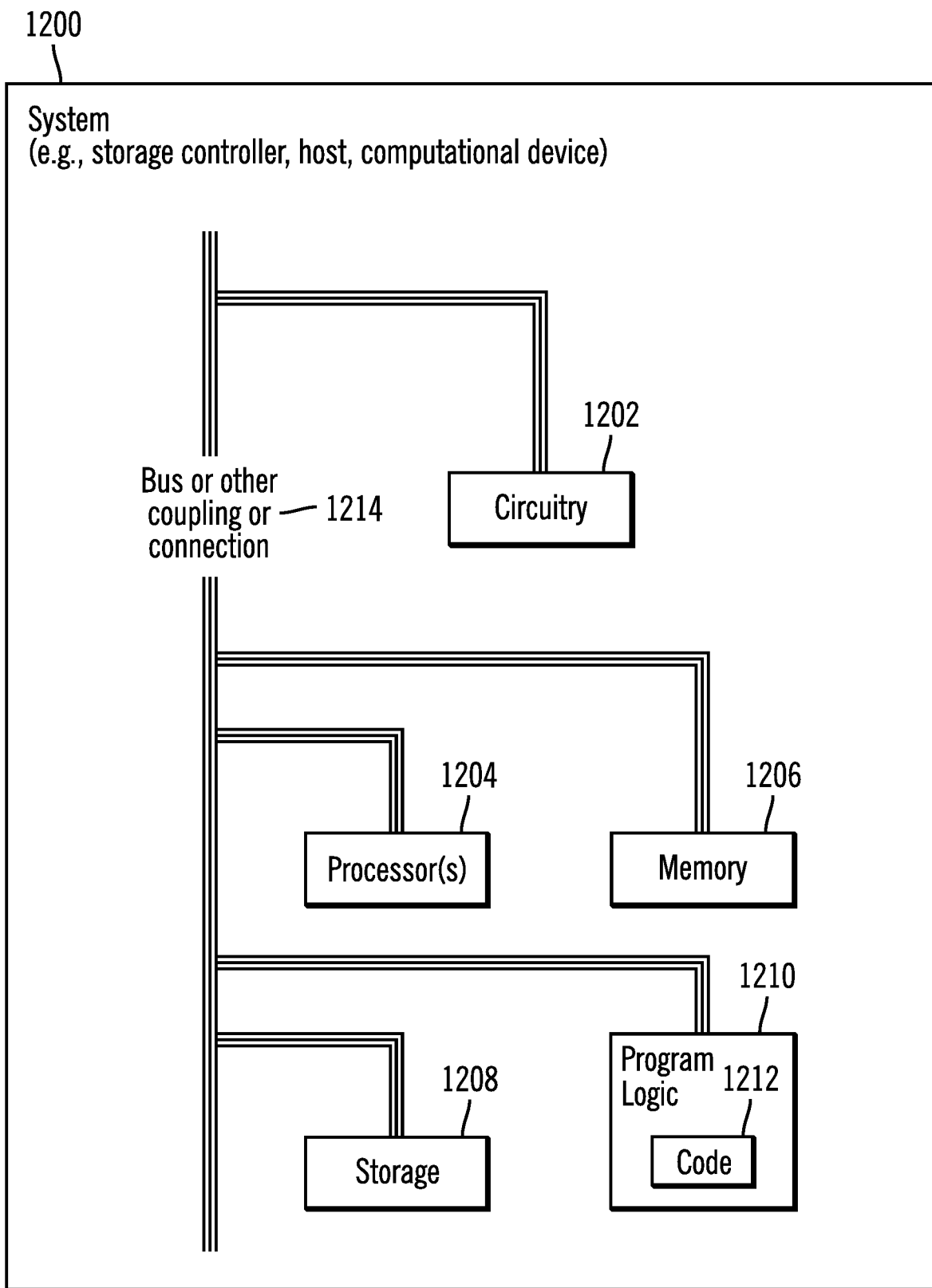
FIG. 12 illustrates a block diagram of a computational system that shows certain elements that may be included in the storage controller or the host, as described in FIGS. 1-11, in accordance with certain embodiments.

FIG. 12 illustrates a block diagram that shows certain elements that may be included in the storage controller 102 or the host 104, or other computational devices in accordance with certain embodiments. The system 1200 may include a circuitry 1202 that may in certain embodiments include at least a processor 1204. The system 1200 may also include a memory 1206 (e.g., a volatile memory device), and storage 1208. The storage 1208 may include a non-volatile memory device (e.g., EEPROM, ROM, PROM, flash, firmware, programmable logic, etc.), magnetic disk drive, optical disk drive, tape drive, etc. The storage 1208 may comprise an internal storage device, an attached storage device and/or a network accessible storage device. The system 1200 may include a program logic 1210 including code 1212 that may be loaded into the memory 1206 and executed by the processor 1204 or circuitry 1202. In certain embodiments, the program logic 1210 including code 1212 may be stored in the storage 1208. In certain other embodiments, the program logic 1210 may be implemented in the circuitry 1202. One or more of the components in the system 1200 may communicate via a bus or via other coupling or connection 1214. Therefore, while FIG. 12 shows the program logic 1210 separately from the other elements, the program logic 1210 may be implemented in the memory 1206 and/or the circuitry 1202.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
calculating a first number of destage task control blocks (TCB) needed by a storage rank, wherein the destage TCBs are for performing destaging operations in a storage controller controlling the storage rank;
calculating a first number of stage TCBs needed by the storage rank, wherein the stage TCBs are for performing staging operations in the storage controller, by performing:
  maintaining a threshold and a queue size comprising a number of read misses waiting for a stage TCB;
  in response to determining that the queue size is less than the threshold, the first number of stage TCBs is made to equal the threshold; and
  in response to determining that the queue size is not less than the threshold, the first number of stage TCBs is made to equal a sum of a first quantity and a second quantity,
wherein the first quantity is the threshold and the second quantity is a fraction of a difference between the queue size and the threshold; and
allocating a second number of stage TCBs and a second number of destage TCBs based on the first number of destage TCBs, the first number of stage TCBs, an amount of usage of non-volatile storage (NVS) of the storage controller, and an average response time of the storage rank.

2. The method of claim 1, the method further comprising:
stopping allocating both stage TCBs and destage TCBs, in response to determining that the average response time of the storage rank exceeds a second threshold that is greater than a first threshold.

3. The method of claim 1, the method further comprising:
calculating the first number of stage TCBs, based on how many read misses are waiting for a stage TCB.

4. The method of claim 3, the method further comprising:
calculating the first number of destage TCBs, based on at least NVS usage for the storage rank, a maximum NVS space allowed for the storage rank, and a low threshold of NVS usage for the storage rank below which there is no need to allocate destage TCBs.

5. The method of claim 1, wherein the second number of destage TCBs is different from the first number of destage TCBs, and wherein the second number of stage TCBs is different from the first number of stage TCBs.

6. A system, comprising:
a memory; and
a processor coupled to the memory, wherein the processor performs operations, the operations performed by the processor comprising:
calculating a first number of destage task control blocks (TCB) needed by a storage rank, wherein the destage TCBs are for performing destaging operations in a storage controller controlling the storage rank;
calculating a first number of stage TCBs needed by the storage rank, wherein the stage TCBs are for performing staging operations in the storage controller, by performing:
  maintaining a threshold and a queue size comprising a number of read misses waiting for a stage TCB;
  in response to determining that the queue size is less than the threshold, the first number of stage TCBs is made to equal the threshold; and
  in response to determining that the queue size is not less than the threshold, the first number of stage TCBs is made to equal a sum of a first quantity and a second quantity, wherein the first quantity is the threshold and the second quantity is a fraction of a difference between the queue size and the threshold; and
allocating a second number of stage TCBs and a second number of destage TCBs based on the first number of destage TCBs, the first number of stage TCBs, an amount of usage of non-volatile storage (NVS) of the storage controller, and an average response time of the storage rank.

7. The system of claim 6, the operations further comprising:
stopping allocating both stage TCBs and destage TCBs, in response to determining that the average response time of the storage rank exceeds a second threshold that is greater than a first threshold.

8. The system of claim 6, the operations further comprising:
calculating the first number of stage TCBs, based on how many read misses are waiting for a stage TCB.

9. The system of claim 8, the operations further comprising:
calculating the first number of destage TCBs, based on at least NVS usage for the storage rank, a maximum NVS space allowed for the storage rank, and a low threshold of NVS usage for the storage rank below which there is no need to allocate destage TCBs.

10. The system of claim 6, wherein the second number of destage TCBs is different from the first number of destage TCBs, and wherein the second number of stage TCBs is different from the first number of stage TCBs.

11. A computer program product, the computer program product comprising a computer readable storage medium having computer readable program code embodied therewith, the computer readable program code configured to perform operations, the operations comprising: calculating a first number of destage task control blocks (TCB) needed by a storage rank, wherein the destage TCBs are for performing destaging operations in a storage controller controlling the storage rank;
calculating a first number of stage TCBs needed by the storage rank, wherein the stage TCBs are for performing staging operations in the storage controller, by performing:
  maintaining a threshold and a queue size comprising a number of read misses waiting for a stage TCB;
  in response to determining that the queue size is less than the threshold, the first number of stage TCBs is made to equal the threshold; and
  in response to determining that the queue size is not less than the threshold, the first number of stage TCBs is made to equal a sum of a first quantity and a second quantity,
wherein the first quantity is the threshold and the second quantity is a fraction of a difference between the queue size and the threshold; and
allocating a second number of stage TCBs and a second number of destage TCBs based on the first number of destage TCBs, the first number of stage TCBs, an amount of usage of non-volatile storage (NVS) of the storage controller, and an average response time of the storage rank.

12. The computer program product of claim 11, the operations further comprising:

stopping allocating both stage TCBs and destage TCBs, in response to determining that the average response time of the storage rank exceeds a second threshold that is greater than a first threshold.

13. The computer program product of claim 11, the operations further comprising:

calculating the first number of stage TCBs, based on how many read misses are waiting for a stage TCB.

14. The computer program product of claim 13, the operations further comprising:

calculating the first number of destage TCBs, based on at least NVS usage for the storage rank, a maximum NVS space allowed for the storage rank, and a low threshold of NVS usage for the storage rank below which there is no need to allocate destage TCBs.

15. The computer program product of claim 11, wherein the second number of destage TCBs is different from the first number of destage TCBs, and wherein the second number of stage TCBs is different from the first number of stage TCBs.

* * * * *